United States Patent [19]

Yamada

[11] 4,449,794
[45] May 22, 1984

[54] IMAGING OPTICAL SYSTEM

[75] Inventor: Kenji Yamada, Yokohama, Japan

[73] Assignee: Nippon Kogaku K.K., Tokyo, Japan

[21] Appl. No.: 324,989

[22] Filed: Nov. 25, 1981

[30] Foreign Application Priority Data

Dec. 10, 1980 [JP] Japan ................................ 55-173122

[51] Int. Cl.³ .............................................. G02B 9/34
[52] U.S. Cl. .................................................. 350/472
[58] Field of Search ................ 350/472, 475, 503, 505

[56] References Cited

U.S. PATENT DOCUMENTS 1,865,977  7/1932  Sonnefeld ............................. 350/475

FOREIGN PATENT DOCUMENTS 444350  3/1936  United Kingdom ................ 350/472

Primary Examiner—John K. Corbin
Assistant Examiner—Rebecca D. Gass
Attorney, Agent, or Firm—Fitzpatrick, Cella, Harper & Scinto

[57] ABSTRACT

An imaging optical system for photographing an object or an object image at a short distance includes, in succession from the object side, a first positive lens, a second positive lens disposed with a great air space from the first positive lens, a negative lens, and a third positive lens.

5 Claims, 4 Drawing Figures

IMAGING OPTICAL SYSTEM

BACKGROUND OF THE INVENTION

1. Field of the Invention

This invention relates to an imaging optical system for effecting photography of an object image in a photographing apparatus, particularly an apparatus such as a telescope or a microscope which enables the object image by an objective lens to be observed through an eyepiece.

2. Description of the Prior Art

As a method of effecting telephotography by the use of a telescope, for example, an interchangeable eyepiece type telescope used for the observation of wild birds or a shooting target, it is known to move the eyepiece and use it as a relay lens. That is, as shown in FIG. 1 of the accompanying drawings, the spatial image I by an objective lens $L\theta$ is enlarged and projected onto a film surface F by an eyepiece Le moved from a usual position, namely a position for observation by the naked eye, thereby effecting telephotography of an object. However, according to this method, photography is effected through an eyepiece originally designed for observation by the naked eye and therefore, aberrations such as chromatic aberration, curvature of image field, distortion, etc. have been great and there has been a marked difference in quality of image as compared with a telephoto lens exclusively for use for photography.

SUMMARY OF THE INVENTION

It is an object of the present invention to provide an imaging optical system for photography which is capable of photographing object images with an excellent imaging performance.

The invention will become fully apparent from the following detailed description thereof taken in conjunction with the accompanying drawings.

DESCRIPTION OF THE PREFERRED EMBODIMENTS

Figure 1:
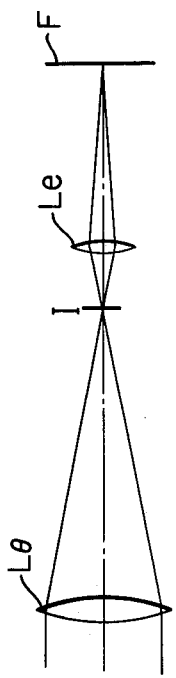
FIG. 1 shows the construction according to the prior art.
Figure 2:
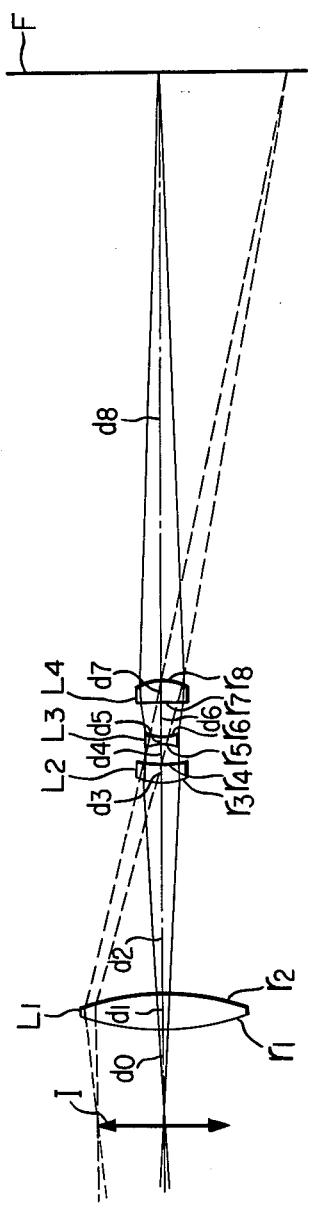
FIG. 2 illustrates the lens construction and optical path according to the present invention.

The imaging optical system according to the present invention, as shown in FIG. 2, has, in succession from the object side, a first positive lens $L_1$, a second positive lens $L_2$ disposed with a great air space from the first positive lens, a negative lens $L_3$, and a third positive lens $L_4$. This imaging optical system satisfies the following conditions:

$$0.3f_1 < d_2 < 1.5f_1 \quad (1)$$

$$0.3f < f_1 < f \quad (2)$$

$$0.1 < -r_5/f_{2-4} < 0.5 \quad (3)$$

where $f_1$ is the focal length of the first positive lens, $f_{2-4}$ is the composite focal length of the second positive lens, the negative lens and the third positive lens, f is the total focal length of the entire system, $d_2$ is the air space between the first positive lens and the second positive lens, and $r_5$ is the radius of curvature of that surface of the negative lens $L_3$ which is adjacent to the object side.

When the optical system of the present invention is used for photography by a telescope, it is disposed in place of the eyepiece rearwardly of the objective lens.

The above-mentioned conditions will hereinafter be described.

The system comprising three lenses, i.e., the second positive lens $L_2$, the negative lens $L_3$ and the third positive lens $L_4$, is a triplet type lens well known as a photographic lens. The entrance pupil of the triplet type lens is usually located near the lens and therefore, such lens, if unchanged, is inconvenient to relay the image by a substantially telecentric light beam like the intermediate image formed by the objective lens of a telescope. Therefore, the first positive lens $L_1$ is disposed as a field lens immediately rearwardly of the intermediate image to cause the light beam to be temporally converged thereat and then enter the triplet type lens $L_2$-$L_4$ and be imaged thereby. Accordingly, it is advisable that the triplet type lens $L_2$-$L_4$ is disposed near the rearward focus of the first positive lens $L_1$. It is in this connection that the condition (1) about the spacing $d_2$ between the first positive lens $L_1$ and the second positive lens $L_2$ is necessary. If the lower limit or the upper limit of this condition is exceeded, the light beam will not be directed to an appropriate position and good aberration correction cannot be accomplished.

Since the first positive lens $L_1$ as a field lens is disposed immediately rearwardly of the intermediate image, the contribution of the entire relay lens system to power is small but the influence it imparts to the Petzval sum is great. Therefore, condition (2) is necessary. If the upper limit of this condition is exceeded, the refractive power of the first positive lens will become too small and this lens will become unable to perform the original function as a field lens, and if the lower limit of this condition is exceeded, the refractive power of the first positive lens will become too great and the Petzval sum of the entire relay system will be greatly increased in the positive sense to aggravate the curvature of image field.

Further, since the first positive lens is comprised of a single lens, spherical aberration remains to be under and therefore, the distortion as the entire lens system is greatly created in the positive sense. The distortion is corrected by causing it to be created in the negative sense by the rearwardly disposed negative lens $L_3$ and third positive lens $L_4$, and particularly the contribution of that surface $r_5$ of the negative lens $L_3$ which is adjacent to the object side is great. Therefore, condition (3) is necessary. If the upper limit of this condition is exceeded, the distortion created in the first positive lens $L_1$ cannot completely be corrected because the refracting action on that surface $r_5$ of the negative lens which is adjacent to the object side is small as compared with the total focal length $f_{2-4}$ of the three rearward lenses. If the lower limit of this condition is exceeded, the refracting action on this surface $r_5$ will be too great and therefore, over-correction will occur. In any of these cases, it is very difficult to correct distortion well by other lens elements.

In the construction of the present invention as described above, the air space $d_2$ between the first positive lens $L_1$ and the second positive lens $L_2$ should desirably be greater than the combined center thickness ($d_3 + d_4 + d_5 + d_6 + d_7$) of the second positive lens $L_2$ to the third positive lens $L_4$. It is also desirable that the second positive lens $L_2$ be a positive meniscus lens having its convex surface facing the object side, that the negative lens $L_3$ be a biconcave lens having its surface of sharper curvature on the image side, and that the third positive lens $L_4$ be a positive lens having its surface of sharper curvature facing the image side.

The numerical data in the embodiments of the imaging optical system according to the present invention will be shown below. In the tables below, $r_1, r_2, \ldots r_8$ represent the radii of curvature of the successive lens surfaces from the object side, $d_1, d_2, \ldots, d_7$ represent the center thicknesses and air spaces of the successive lenses, and $n_1, \ldots n_4$ and $\nu_1, \ldots \nu_4$ represent the refractive indices and Abbe numbers, respectively, of the successive lenses. $d_0$ is the distance from an object or an object image formed by the objective lens to the first positive lens $L_1$.

First Embodiment
f = 62.5   Field Number 22.7
Imaging Magnification 1.90× Petzval Sum 0.01241

| | $d_0 = 16.2$ | | |
|---|---|---|---|
| $r_1 = 51.5$ | $d_1 = 5$ | $n_1 = 1.71300$ | $\nu_1 = 54.0(L_1)$ |
| $r_2 = -68.64$ | $d_2 = 35.7$ | | |
| $r_3 = 11.96$ | $d_3 = 3$ | $n_2 = 1.62041$ | $\nu_2 = 60.4(L_2)$ |
| $r_4 = 37.965$ | $d_4 = 3$ | | |
| $r_5 = -15.952$ | $d_5 = 1.5$ | $n_3 = 1.64831$ | $\nu_3 = 33.8(L_3)$ |
| $r_6 = 10.98$ | $d_6 = 5$ | | |
| $r_7 = 67.3$ | $d_7 = 4$ | $n_4 = 1.62041$ | $\nu_4 = 60.4(L_4)$ |
| $r_8 = -12.3$ | | | |

$f_1 = 42.0$
$f = 62.5$
$f_{2\sim 4} = 45.8$

Second Embodiment
f = 62.4   Field Number 22.7
Imaging Magnification 1.90× Petzval Sum 0.01336

| | $d_0 = 15.9$ | | |
|---|---|---|---|
| $r_1 = 62.65$ | $d_1 = 5$ | $n_1 = 1.71300$ | $\nu_1 = 54.0(L_1)$ |
| $r_2 = -55.46$ | $d_2 = 35.9$ | | |
| $r_3 = 14.01$ | $d_3 = 3$ | $n_2 = 1.62041$ | $\nu_2 = 60.4(L_2)$ |
| $r_4 = 53$ | $d_4 = 3$ | | |
| $r_5 = -15.3$ | $d_5 = 1.5$ | $n_3 = 1.62588$ | $\nu_3 = 35.6(L_3)$ |
| $r_6 = 11.96$ | $d_6 = 4.8$ | | |
| $r_7 = 68.829$ | $d_7 = 4$ | $n_4 = 1.62041$ | $\nu_4 = 60.4(L_4)$ |
| $r_8 = -12.394$ | | | |

$f_1 = 42.0$
$f = 62.4$
$f_{2\sim 4} = 45.8$

Figure 3:
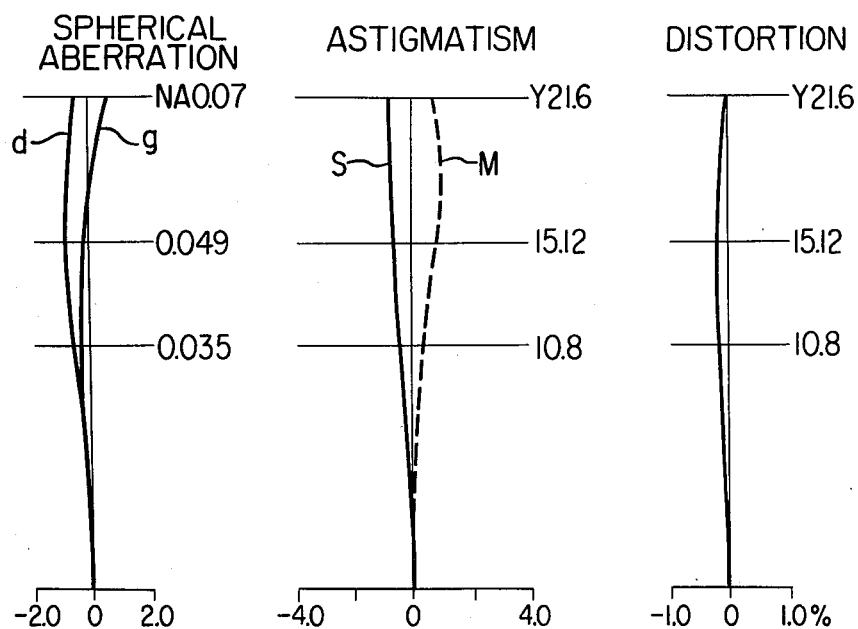
FIGS. 3 and 4 illustrate the aberrations in first and second embodiments, respectively, of the present invention.
Figure 4:
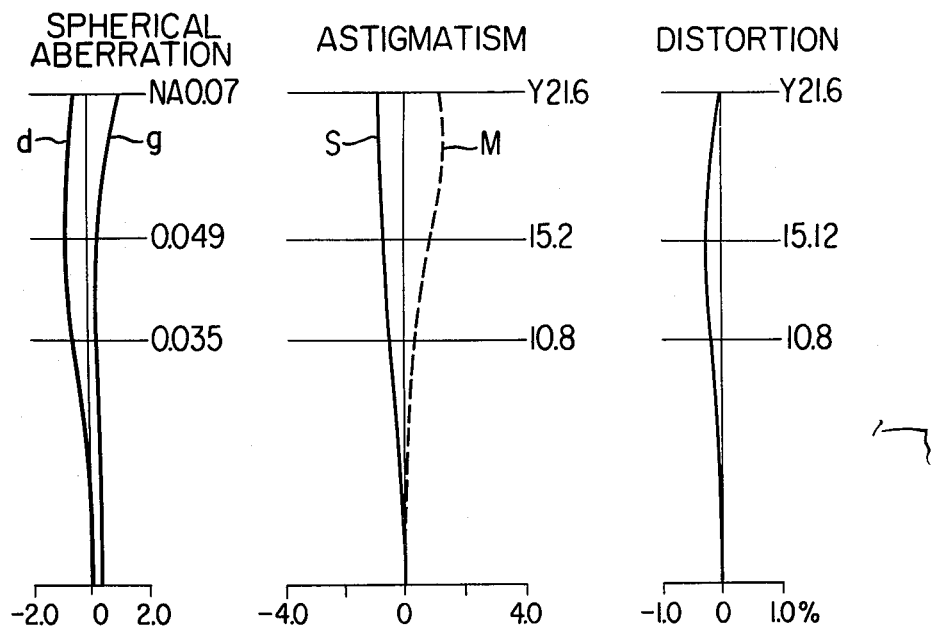

To show the imaging performances of the first and second embodiments, spherical aberration, astigmatism and distortion are illustrated in FIGS. 3 and 4. As can be seen from FIGS. 3 and 4, in both embodiments, correction of aberrations is achieved to the same degree as the ordinary telephotographic lens and chromatic aberration is also corrected well, and an excellent imaging performance is provided.

Thus, if the imaging optical system of the present invention is used as a photographic optical system for telescope, various aberrations, particularly curvature of image field and distortion will be improved and chromatic aberration will be improved by making the optical system usable exclusively for photography, and it will be possible to accomplish photography which is sufficiently satisfactory in quality of image. The imaging optical system of the present invention is usable not only for telescopes but also for microscopes, and if the intermediate image by the objective lens is replaced by an object, the imaging optical system of the present invention can also be used as an objective lens for enlarged photography.

I claim:

1. An imaging optical system for photographing an object or a subtantially flat object image at a short distance, including, in succession from the object side, a first positive lens for converging light rays from the object or the substantially flat object image, a second positive lens having of meniscus shape convex toward the object side and disposed with a great air space from said first positive lens, a biconcave negative lens having its surface of sharper curvature on the image side, and a third positive lens having its surface of sharper curvature facing the image side.

2. An imaging optical system according to claim 1, satisfying the following conditions:

$$0.3f_1 < d_2 < 1.5f_1 \tag{1}$$

$$0.3f < f_1 < f \tag{2}$$

$$0.1 < -r_5/f_{2-4} < 0.5 \tag{3}$$

where $f_1$ is the focal length of said first positive lens, $f_{2-4}$ is the composite focal length of said second positive lens, said negative lens and said third positive lens, f is the total focal length of the entire system, $d_2$ is the air space between said first positive lens and said second positive lens, and $r_5$ is the radius of curvature of that surface of said negative lens which is adjacent to the object side.

3. An imaging optical system according to claim 2, wherein the air space between said first positive lens and said second positive lens is greater than the combined center thickness of said second positive lens to said third positive lens.

4. An imaging optical system according to claim 3, wherein numerical data are as follows:

f = 62.5   Field Number 22.7
Imaging Magnification 1.90× Petzval Sum 0.01241

| | $d_0 = 16.2$ | | |
|---|---|---|---|
| $r_1 = 51.5$ | $d_1 = 5$ | $n_1 = 1.71300$ | $\nu_1 = 54.0(L_1)$ |
| $r_2 = -68.64$ | $d_2 = 35.7$ | | |
| $r_3 = 11.96$ | $d_3 = 3$ | $n_2 = 1.62041$ | $\nu_2 = 60.4(L_2)$ |
| $r_4 = 37.965$ | $d_4 = 3$ | | |
| $r_5 = -15.952$ | $d_5 = 1.5$ | $n_3 = 1.64831$ | $\nu_3 = 33.8(L_3)$ |
| $r_6 = 10.98$ | $d_6 = 5$ | | |
| $r_7 = 67.3$ | $d_7 = 4$ | $n_4 = 1.62041$ | $\nu_4 = 60.4(L_4)$ |
| $r_8 = -12.3$ | | | |

$f_1 = 42.0$
$f = 62.5$
$f_{2\sim 4} = 45.8$ where $r_1, r_2, \ldots r_8$ represent the radii of curvature of the successive lens surfaces from the object side, $d_1, d_2, \ldots, d_7$ represent the center thicknesses and air spaces of the successive lenses, $n_1 \ldots n_4$ and $\nu_1 \ldots \nu_4$ represent the refractive indices and Abbe numbers, respectively, of the successive lenses, and $d_0$ represents the distance from the object or the object image formed by an objective lens to said first positive lens.

5. An imaging optical system according to claim 3, wherein numerical data are as follows:

f = 62.4   Field Number 22.7
Imaging Magnification 1.90× Petzval Sum 0.01336

| | $d_0 = 15.9$ | | |
|---|---|---|---|
| $r_1 = 62.65$ | $d_1 = 5$ | $n_1 = 1.71300$ | $\nu_1 = 54.0(L_1)$ |
| $r_2 = -55.46$ | $d_2 = 35.9$ | | |
| $r_3 = 14.01$ | $d_3 = 3$ | $n_2 = 1.62041$ | $\nu_2 = 60.4(L_2)$ |

-continued f = 62.4  Field Number 22.7
Imaging Magnification 1.90× Petzval Sum 0.01336

| | | | |
|---|---|---|---|
| $r_4 = 53$ | $d_4 = 3$ | | |
| $r_5 = -15.3$ | $d_5 = 1.5$ | $n_3 = 1.62588$ | $\nu_3 = 35.6(L_3)$ |
| $r_6 = 11.96$ | $d_6 = 4.8$ | | |
| $r_7 = 68.829$ | $d_7 = 4$ | $n_4 = 1.62041$ | $\nu_4 = 60.4(L_4)$ |
| $r_8 = -12.394$ | | | |
| | $f_1 = 42.0$ | | |
| | $f = 62.4$ | | |

-continued f = 62.4  Field Number 22.7
Imaging Magnification 1.90× Petzval Sum 0.01336

$f_{2\sim 4} = 45.8$ where $r_1, r_2, \ldots, r_8$ represent the radii of curvature of the successive lens surfaces from the object side, $d_1, d_2, \ldots, d_7$ represent the center thicknesses and air spaces of the successive lenses, $n_1 \ldots n_4$ and $\nu_1 \ldots \nu_4$ represent the refractive indices and Abbe numbers, respectively, of the successive lenses, and $d_0$ represents the distance from the object or the object image formed by an objective lens to said first positive lens.

* * * * *